United States Patent
Parkinson

(10) Patent No.: US 10,127,129 B2
(45) Date of Patent: Nov. 13, 2018

(54) NON-INVASIVE TIME-BASED PROFILING TOOL

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1631 days.

(21) Appl. No.: 11/712,338

(22) Filed: Feb. 27, 2007

(65) Prior Publication Data
US 2008/0209402 A1    Aug. 28, 2008

(51) Int. Cl.
*G06F 11/32*    (2006.01)
*H04L 12/24*    (2006.01)
*G06F 11/34*    (2006.01)
*G06F 11/36*    (2006.01)

(52) U.S. Cl.
CPC ........ *G06F 11/323* (2013.01); *G06F 11/3495* (2013.01); *H04L 41/064* (2013.01); *G06F 11/3664* (2013.01); *G06F 2201/835* (2013.01); *G06F 2201/86* (2013.01)

(58) Field of Classification Search
CPC .............. G06F 11/328; G06F 11/3419; G06F 11/3452; G06F 11/3476; G06F 11/3495; G06F 11/363; G06F 11/3664; G06F 2201/835; G06F 2201/865; G06F 11/3051; G06F 11/0709; G06F 11/0775; G06F 2221/2101; G06F 21/552; G06F 21/554; G06F 21/577; G06F 11/323; G06F 11/0769; G06F 2201/86–2201/88; G06F 11/3017; G06F 11/3068; H04L 41/064; H04L 41/069; H04L 41/0631; H04L 41/22; H04L 41/046; H04L 41/0213; H04L 41/0604; H04L 43/06; H04Q 3/0062

USPC .............. 714/45, 46, 51; 717/125, 127–133; 715/700–867, 961, 963, 965–970
See application file for complete search history.

(56) References Cited

U.S. PATENT DOCUMENTS

| | | | |
|---|---|---|---|
| 5,592,600 A * | 1/1997 | De Pauw et al. | 345/440 |
| 6,219,701 B1 * | 4/2001 | Hirata et al. | 714/E11.025 |
| 6,470,388 B1 * | 10/2002 | Niemi et al. | 709/224 |
| 6,591,228 B1 * | 7/2003 | Hall et al. | 702/187 |

(Continued)

OTHER PUBLICATIONS

Parulkar, Guru, Douglas Schmidt, Eileen Kraemer, Jonathan Turner, and Anshul Kantawala. "An Architecture for Monitoring, Visualization, and Control of Gigabit Networks." Sep./Oct. 1997. IEEE Network. pp. 34-43.*

*Primary Examiner* — Emerson Puente
*Assistant Examiner* — Erika Kretzmer
(74) *Attorney, Agent, or Firm* — Lowenstein Sandler LLP

(57) ABSTRACT

A software execution profiling method comprising: collecting, from a plurality of subsystems of a client machine, information including an event report corresponding to each of a plurality of events occurring in the plurality of subsystems, each event report specifying an event identifier and a cause identifier; responsive to determining that the cause identifier includes an empty field, determining time values in the information associated with the first event and a second which caused the first event; determining to indicate a causation relationship between the first event and the second event in view of the time value of the second event being within the defined period of the time value of the first event; and presenting via a graphical user interface (GUI) the events and an indicator of the causation relationship.

23 Claims, 5 Drawing Sheets

(56) References Cited

U.S. PATENT DOCUMENTS

| | | | |
|---|---|---|---|
| 6,697,791 B2* | 2/2004 | Hellerstein | G06N 5/025 |
| | | | 706/47 |
| 6,738,083 B2* | 5/2004 | Allen | 715/781 |
| 6,938,082 B2* | 8/2005 | Hirata et al. | 709/224 |
| 6,978,302 B1* | 12/2005 | Chisholm et al. | 714/43 |
| 7,324,108 B2* | 1/2008 | Hild et al. | 345/440 |
| 7,404,180 B2* | 7/2008 | Wedel et al. | 717/128 |
| 7,428,734 B2* | 9/2008 | Kobylinski et al. | 714/E11.207 |
| 8,473,922 B2* | 6/2013 | Li et al. | 717/127 |
| 8,751,624 B1* | 6/2014 | Jacobson et al. | 709/224 |
| 8,762,951 B1* | 6/2014 | Kosche | G06F 11/3476 |
| | | | 717/127 |
| 2001/0054094 A1* | 12/2001 | Hirata et al. | 709/223 |
| 2002/0165842 A1* | 11/2002 | Hellerstein | G06N 5/025 |
| | | | 706/47 |
| 2003/0056200 A1* | 3/2003 | Li et al. | 717/128 |
| 2003/0220940 A1* | 11/2003 | Futoransky et al. | 707/104.1 |
| 2004/0260758 A1* | 12/2004 | Hirata et al. | 709/200 |
| 2005/0125276 A1* | 6/2005 | Rusu | 705/9 |
| 2005/0132337 A1* | 6/2005 | Wedel et al. | 717/128 |
| 2005/0138641 A1* | 6/2005 | Kobylinski et al. | 719/318 |
| 2008/0065765 A1* | 3/2008 | Hild et al. | 709/224 |

\* cited by examiner

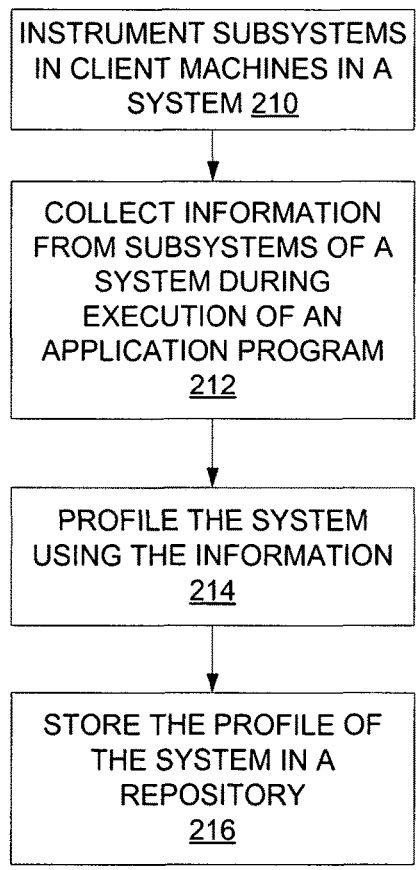
FIG. 2A
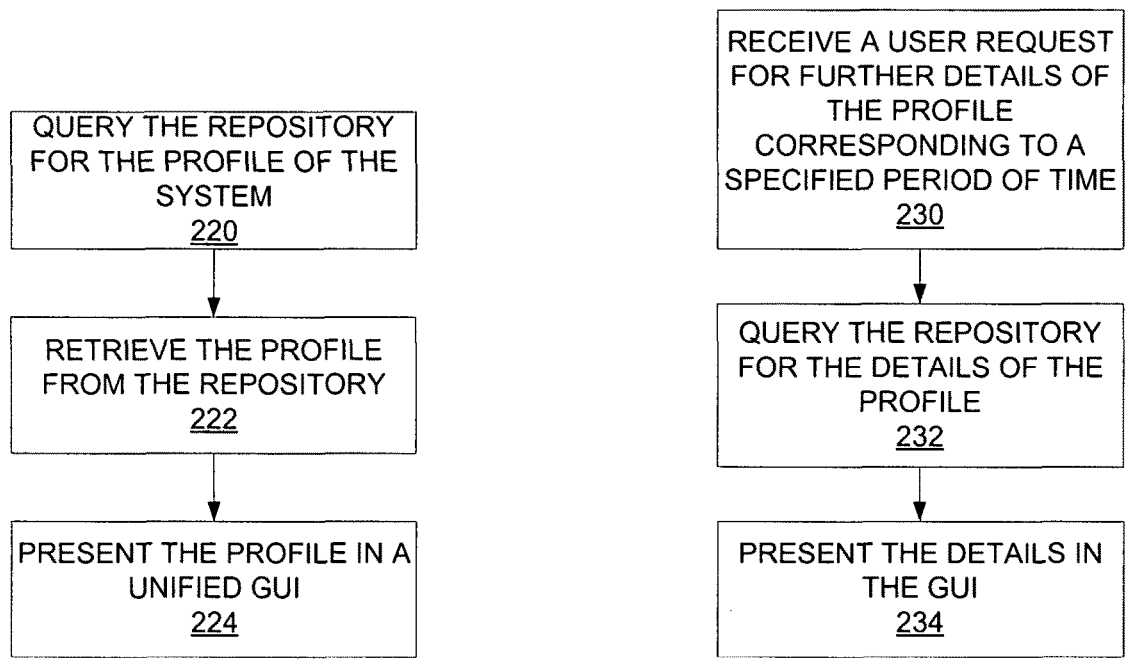
FIG. 2B
FIG. 2C

NON-INVASIVE TIME-BASED PROFILING TOOL

TECHNICAL FIELD

Embodiments of the present invention relate to profiling a system, and more specifically to profiling a system during execution of an application program on a time basis.

BACKGROUND

One important task in application program development is to troubleshoot and debug problems and/or errors in application programs. In general, it is not always easy to troubleshoot problems in application programs, especially in application programs that are deployed in a large networked system, where multiple machines execute at least a portion of the application programs. For example, in a client server environment, one part of an application program may be executed on a server while another part of the application program may be executed on a client. In some cases, even though an entire application program is executed on one machine, the machine may have to interact with another application program being executed on another machine coupled to the machine.

Conventional debugging tools typically allow developers to evaluate execution of an application program in relation to a particular subsystem of a machine. For example, one conventional debugging tool may generate a log of events occurred in an operating system (OS) of a machine during execution of an application program. However, conventional debugging tools typically do not track the interaction between various subsystems of a machine. Furthermore, many conventional debugging tools fail to provide any information on or insight into the effect and/or impact of the execution of the application program on other subsystems within the machine, let alone the effect and/or impact of the execution of the application program on other machines that interact with the machine executing the application program. As a result, it is difficult to determine a root cause of a problem using such debugging tools because of the limited information provided.

Although developers may use multiple debugging tools to collect information from different subsystems, or even from different machines, the developers have to manually sieve through the information collected in order to analyze the information. To further complicate the task, some of the conventional debugging tools may generate different types of information in multiple formats, thus making the job of analyzing the information from different debugging tools more difficult.

DESCRIPTION OF THE DRAWINGS

The present invention is illustrated by way of example, and not by way of limitation, in the figures of the accompanying drawings and in which:

FIG. 2A illustrates flow diagram of some embodiments of a process to profile a system.

FIG. 2B illustrates a flow diagram of one embodiment of a process to present a profile of a system.

FIG. 2C illustrates a flow diagram of one embodiment of a process to present a profile of a system.

DETAILED DESCRIPTION

Figure 1:
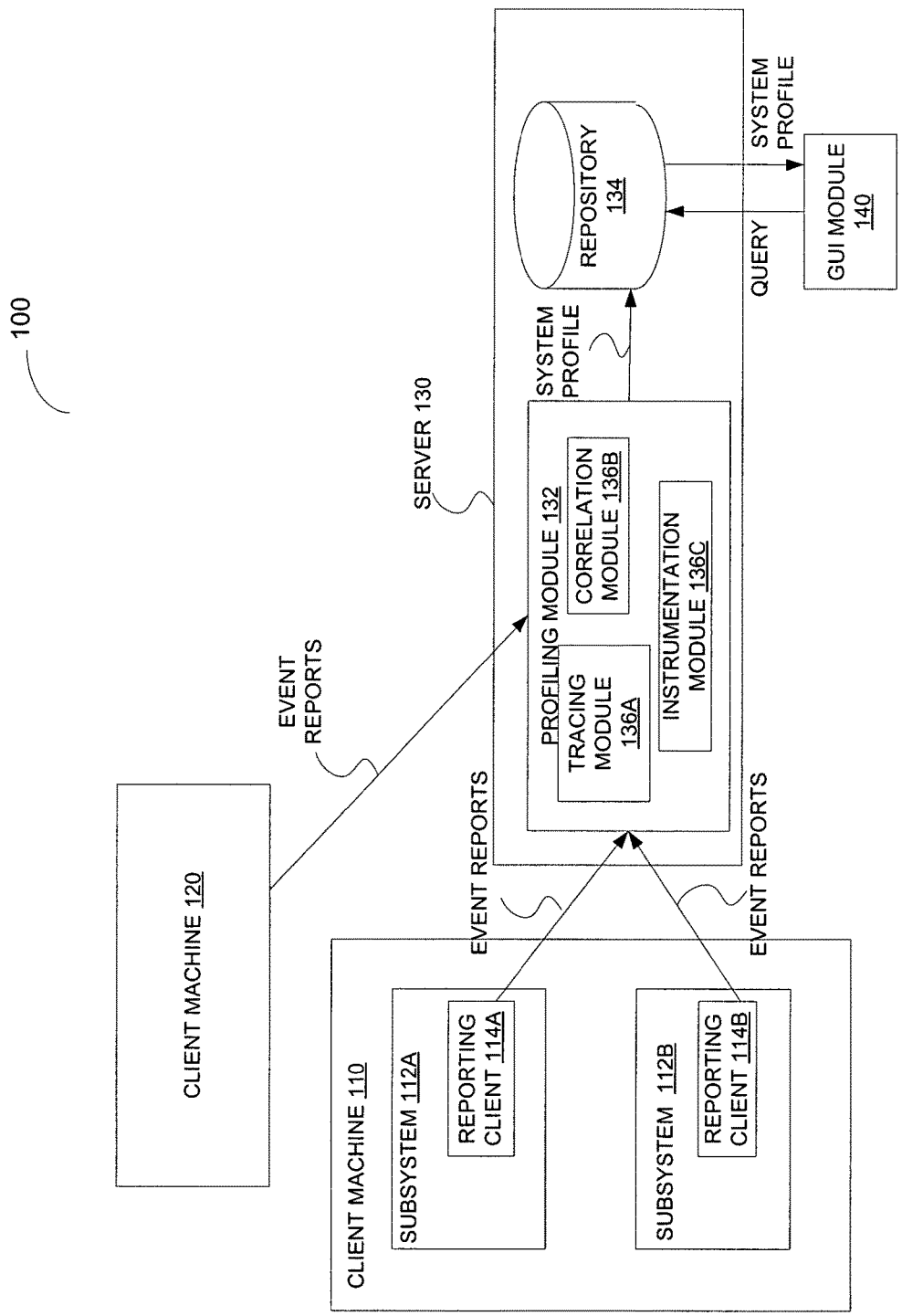
FIG. 1 illustrates an exemplary embodiment of a system in which embodiments of the present invention may be implemented.

Described herein is a non-invasive time-based profiling tool. In one embodiment, the tool profiles a system using information on each of a number of events collected from a set of subsystems in at least one client machine in the system. Then a profile of the system is caused to be presented in a unified graphical user interface (GUI). Before going into the details of some embodiments of the invention, some of the terms used herein are explained below.

A system as used herein generally refers to a set of machines operable with each other to execute an application program or a suite of application programs. Some examples of the machines include a client machine implemented on a personal computer, a server, etc. A subsystem as used herein generally refers to a group of components within a machine operable with each other to perform one or more specific functions and/or tasks, such as data packet transmission, disk management, etc. The components may include software, hardware, firmware, or a combination of any of the above. An event as used herein generally refers to a detectable action performed by a user, hardware, software, firmware, or a combination of any of the above. Some examples of an event include a user pressing a button, a network adapter sending and/or receiving data packets, an operating system opening a file, a graphics module drawing a GUI element, etc. A unified GUI as used herein refers to a GUI having one or more displays, windows, pages, etc., to coherently present a portion or the entirety of the profile of the system. In other words, the unified GUI presents the profile in a consistent and logical manner.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary embodiment of a networked system 100 in which embodiments of the present invention may be implemented. The networked system 100 includes two client machines 110 and 120 and a server 130. The client machines 110 and 120 may or may not be substantially identical. Some examples of the client machines 110 and 120 include a desktop personal computer (PC), a laptop PC, a personal digital assistant (PDA), a cellular telephone or mobile telephone, etc. Each of the client machines 110 and 120 include a number of subsystems. To illustrate the concept, the client machine 110 is described in details below as an example. The client machine 110 includes subsystems 112A and 112B. The subsystems 112A and 112B may include hardware, software, firmware, or a combination thereof. Some examples of the subsystems 112A and 1121B include a windowing system, an operating system (OS), an Ethernet driver, a central processing unit (CPU), a graphics processor, etc. Further, the subsystems 112A and 112B include reporting clients 114A and 114B, respectively. The reporting clients 114A and 114B are communicatively coupled to the server 130. For instance, the reporting clients 114A and 114B may be coupled to the server 130 via a network, which may include one or more of a local area network (LAN), a wide area network (WAN), an intranet, etc.

In some embodiments, the server 130 includes a profiling module 132 and a repository 134. The profiling module 132 includes a tracing module 136A, a correlation module 136B, and an instrumentation module 136C. The profiling module 132 is operatively coupled to the repository 134. Further, the repository 134 is accessible by a graphical user interface (GUI) module 140. The GUI module 140 may be implemented on the server 130 as well. Alternatively, the GUI module 140 may be implemented on a client machine, such as client machines 110 and 120.

Note that any or all of the components and the associated hardware illustrated in FIG. 1 may be used in various embodiments of the networked system 100. However, it should be appreciated that other configurations of the networked system 100 may include more or fewer devices than those shown in FIG. 1.

During execution of an application program or a suite of application programs by the client machines 110 and 120, many events may occur, in which various subsystems within the client machines 110 and 120 may perform individual tasks and/or interact with each other. It is useful to trace the events that occur during the execution. By tracing the events, the system 100 is profiled such that operation and performance of various components within the system 100 can be studied. The profile of the system may provide developers of the application programs with useful information to debug and/or to improve the application programs. For instance, the developers may find out which subsystem in the system 100 is a bottleneck gating the performance of the entire system 100, which subsystem is under-utilized in a certain event, which subsystem causes an error, etc. Details of some embodiments of the profiling of the system 100 are described below.

In some embodiments, the instrumentation module 136C of the profiling module 132 instruments the subsystems (e.g., subsystems 112A and 112B) in the client machines 110 and 120. Note that the instrumentation does not require modification of the source code of the application programs. For example, code may be added to an OS of each of the client machines 110 and 120 on a system call level such that an event is generated every time a call is made. Alternatively, a tool module may be added onto each of the client machines 110 and 120 to instrument the subsystems in the respective client machine.

After the subsystems have been instrumented, the code added by the instrumentation module 136C is executed to collect information from the subsystems during execution of the application programs. Some examples of the information collected include utilization of central processing unit (CPU) of each of the client machines 110 and 120, code pages being executed, network traffic, graphics device contexts, user interface events, remote procedure calls made, system and library calls made, etc. After the information is collected, the information may be temporarily held in a storage device within the respective client machine (e.g., a RAM within a respective client machine). A reporting client in a respective subsystem (e.g., the reporting clients 114A and 114B) may provide the information to the tracing module 136A in the server 130.

In some embodiments, each of the reporting clients 114A and 114B puts the information of the respective subsystem into an event report and sends the event report to the profiling module 132. In general, the event report is a data structure generated by a subsystem that post-processes existing output from the subsystem. The event report of a particular event may include a unique event identifier to identify the particular event, such as a randomly generated number, a number incremented as each event occurs, etc. The event report may further include a unique identifier for the respective client machine, a unique identifier for the respective subsystem, a unique identifier for the type of this particular event (e.g., "opening a file," "reading a file," "receiving a packet," etc.), a timestamp of this particular event, and a "cause" field to hold a set of event identifiers for the events that have caused or triggered this particular event.

Using the information collected from various subsystems of different client machines, the tracing module 136A traces the events occurred in the subsystems during execution of the application programs on a time basis. For instance, the tracing module 136A may use the information collected (e.g., the timestamps in the event reports) to determine when the events have occurred, and the order and duration of the events (e.g., a socket open is followed by a socket write, and then a packet is sent, etc.).

In addition to the tracing module 136A, the profiling module 132 includes the correlation module 136B. In some embodiments, the correlation module 136B determines causation relationships (also commonly referred to as "cause-and-effect") between some of the events by extracting the causation information from the event reports submitted by various subsystems. For example, an event report of a particular event may include the identifiers of events that caused or triggered the particular event as mentioned above. Then the correlation module 136B may extract these identifiers from the event report to determine the causation relationships between the events.

However, the propagation of the event identifiers of events that cause another event may not be possible in some cases without modifying the programming code on the subsystem level. Thus, the "cause" field in the event reports may be left empty. The correlation module 136B may analyze the events on a time-basis to determine the causation relationships between the events, if any. The correlation module 136B may analyze the result from the tracing module 136A to correlate the events. In some embodiments, the correlation module 136B determines causation relationships between some of the events using the time-based result from the tracing module 136A. Specifically, causation relationships between the events may be identified based on the sequence of the events. For example, given a packet is received by the client machine 120 within a predetermined period after a packet is sent from the client machine 110, the correlation module 136B may determine that the sending of the packet from the client machine 110 causes the receiving of the packet at the client machine 120.

Further, since the profiling module 132 receives the information from different subsystems, the profiling module 132 can unify the information, analyze the information of various subsystems (e.g., to determine causation relationships between events, compute aggregate data and/or measurements from the information, etc.), and organize the information of various subsystems and the result of the analysis into a single profile of the system 100. Then the profiling module 132 stores the profile of the system in the repository 134.

Figure 3A:
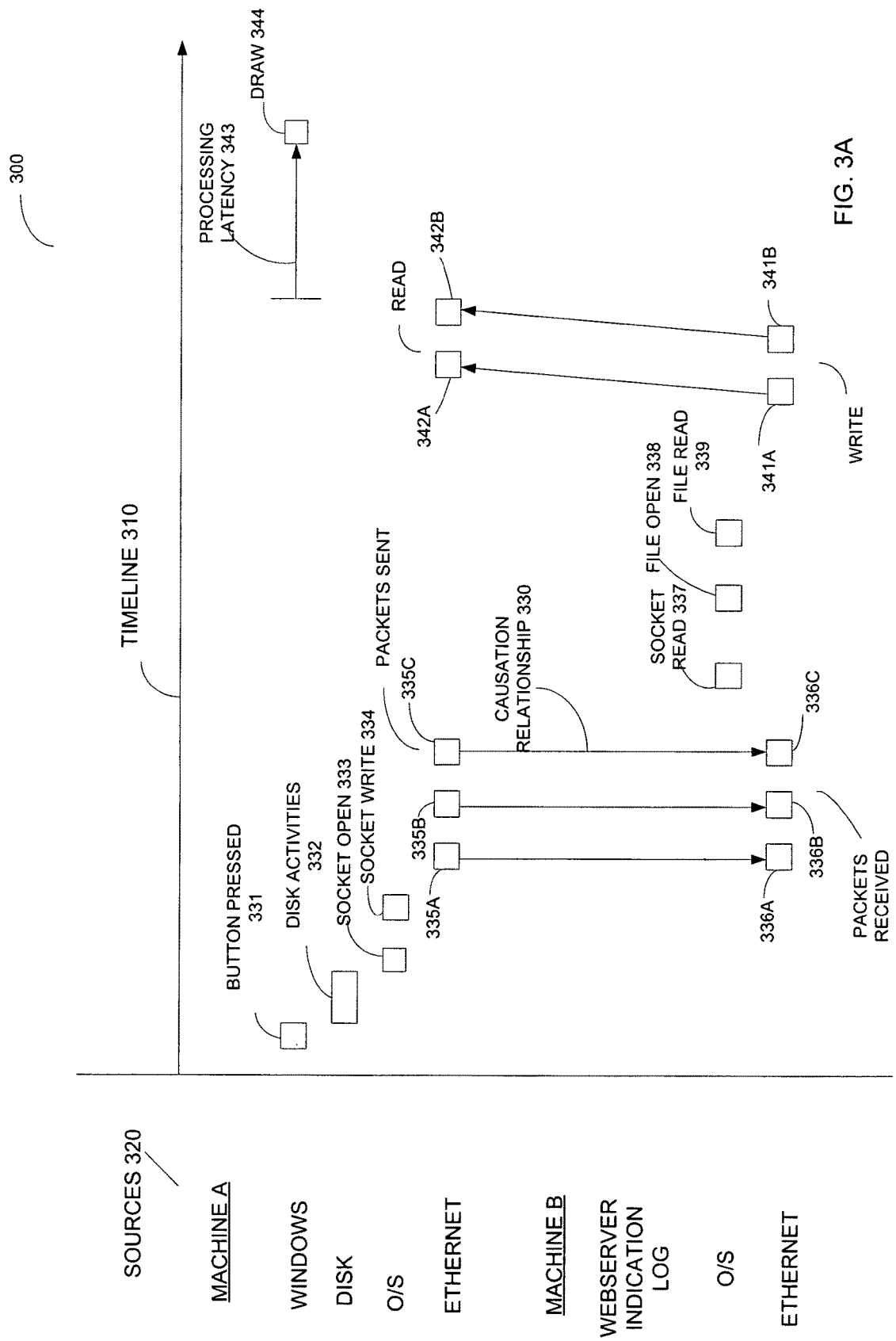
FIG. 3A illustrates one embodiment of a graphical user interface in which embodiments of the present invention may be implemented.
Figure 3B:
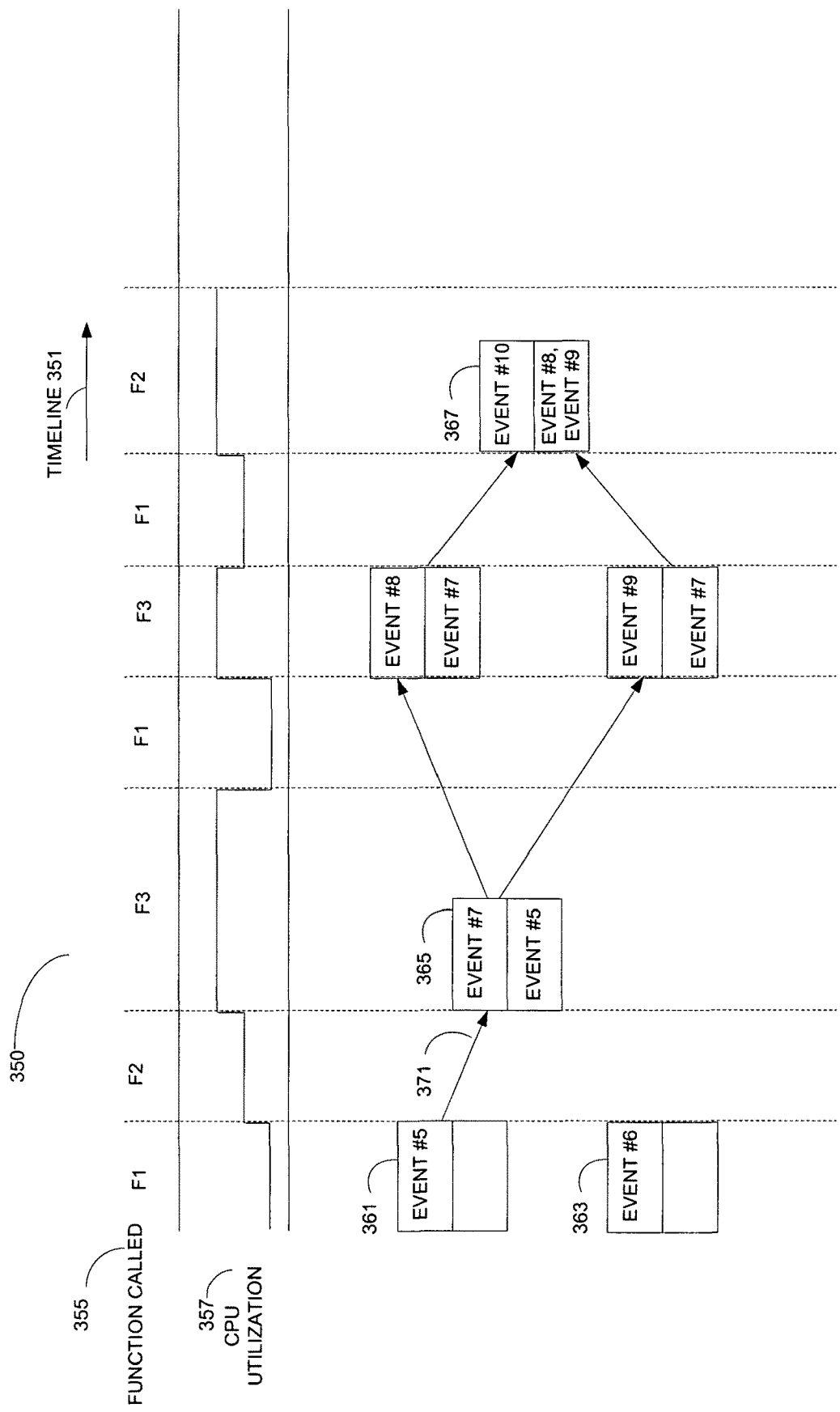
FIG. 3B illustrates an alternate embodiment of a graphical user interface in which embodiments of the present invention may be implemented

The repository 134 is accessible by users via the GUI module 140. In some embodiments, the GUI module 140 generates a GUI to receive user requests for the profile of the system 100 or a portion of the profile. Based on the user requests, the GUI module 140 composes queries and submits the queries to the repository 134 to retrieve the relevant portion of the profile. After retrieving the relevant portion of the profile, the GUI module 140 presents the relevant portion of the profile in a unified GUI. As discussed above, a unified GUI has one or more displays, windows, pages, etc., to coherently present a portion or the entirety of the profile of the system. For instance, a user may request the profile of the system 100 corresponding to a specific time period. In response to the request, the GUI module 140 retrieves at least the portion of the profile of the system 100 corresponding to the specified time period. Then the GUI module 140 presents information in the profile within the specified time period collected from different subsystems to the user in a unified GUI. For example, events occurred within the specified time period in different subsystems are displayed along a timeline in a window, along with various measurements taken, such as memory usage, CPU utilization, etc., also arranged along the timeline. In another example, events occurred within the specified time period in different subsystems are displayed in a graph, such as a directed acyclic graph. Some exemplary embodiments of the unified GUI are illustrated in FIGS. 3A and 3B.

To further illustrate the concept, an example of profiling the system 100 according to some embodiments of the invention is described below. Suppose a user on the client machine 110 is running a web browser, communicating over a network to a web content host running on the client machine 120. A developer wishes to analyze the latency of a typical web transaction carried out via the web browser. The instrumentation module 136C may instrument some subsystems of the client machine 110 to generate event reports during the web transaction, such as the windowing subsystem, the OS subsystem, and the Ethernet adapter driver. For example, the windowing subsystem generates an event report when a user interface button of the browser is actuated and/or when a user interface control (e.g., a key) of a user input device (e.g., a keyboard, a mouse, etc.) is actuated. The OS subsystem generates an event report when a program performs an operation on a file descriptor. The Ethernet adapter driver generates an event report when a network packet is sent or received.

Further, some subsystems of client machine 120, such as an Ethernet adapter driver and an OS subsystem, are also instrumented to generate event reports during the web transaction. For example, the Ethernet adapter driver of client machine 120 generates an event report when a network packet is sent or received. The OS subsystem of the client machine 120 generates an event report when an application program performs an operation on a file descriptor. After a test run of the web transaction is completed, the profiling module 132 receives the event reports generated and analyzes the event reports on a time basis to generate a profile of the system 100 during the web transaction. The profile is stored in the repository 134.

In response to a request from the developer, the GUI module 140 queries and retrieves the profile from the repository 134. The GUI module 140 then generates a time-based presentation of the events occurred during the web transaction based on the profile in a unified GUI. The developer may then readily determine the latency of the web traffic between the client machines 110 and 120 during the web transaction using the time-based presentation of the events.

In some embodiments, the amount of information in the system profile may be so huge that it becomes impractical, if not impossible, to present the entire profile in a single window. Thus, the GUI module 140 may provide an abbreviated version of the profile and an additional user interface control to allow users to request presentation of details of a particular portion of the profile. In other words, the GUI module 140 may allow users to "zoom" into a particular portion of the profile. For example, a user may be allowed to move a cursor to a specific point along a timeline in the window and to click at the point to cause the GUI module 140 to present additional details of the profile at a specific time corresponding to the point along the timeline. Alternatively, the user may use the cursor to select a specific portion of the timeline and actuate a user interface control to cause the GUI module 140 to present details of the profile in a period of time corresponding to the selected portion of the timeline. In response to a user request for further details of the profile, the GUI module 140 may submit a query to the repository 134 for the details of the profile requested if the details have not yet been retrieved. After receiving the details from the repository 134, the GUI module 140 may present the details in the unified GUI, such as by overlaying the details on an existing window, generating a second window or a sub-window within the existing window to present the details, etc.

In some embodiments, the system 100 is profiled during a test run of an application program under development. During the test run, event reports are generated by the reporting clients 114A and 114B. The profiling module 132 may analyze the event reports to generate a profile of the system 100 during execution of the application program. A developer of the application program may use the profile to debug and/or improve the application program, such as by identifying bottlenecks during execution of the application program, determining a cause of an unexpected event, measuring the latency of a particular transaction, etc.

Unlike many conventional debugging tools, the above approach profiles the system 100 using information collected from different subsystems within the system 100. The above approach may also correlate the information collected. Thus, a more comprehensive profile may be generated, which is useful in analyzing and/or debugging an application program executed in the system 100.

FIG. 2A illustrates a flow diagram of one embodiment of a process to profile a system. The process may be performed by processing logic that may comprise hardware (e.g., circuitry, dedicated logic, programmable logic, microcode, etc.), software (such as instructions run on a processing device), firmware, or a combination of any of the above. For example, the server 130 in FIG. 1 may perform the process.

Referring to FIG. 2A, processing logic instruments a set of subsystems in a client machine within a system, such as the client machine 10 in FIG. 1 (processing block 210). The subsystems are instrumented to generate event reports, which include information of events (e.g., event identifier, machine identifier, subsystem identifier, timestamp, etc.). Then processing logic collects information from the subsystems during execution of an application program (processing block 212). In some embodiments, processing logic collects information by receiving event reports from the subsystems. Using the information received, processing logic profiles the system (processing block 214). For example, processing logic may profile the system by organizing the information received on a time-basis, analyzing the information to identify any causation relationships between the events, etc. After profiling the system, processing logic stores the profile of the system in a repository (processing block 216). More details of some embodiments of profiling a system have been described above.

FIG. 2B illustrates a flow diagram of one embodiment of a process to present a profile of a system. The process may be performed by processing logic that may comprise hardware (e.g., circuitry, dedicated logic, programmable logic, microcode, etc.), software (such as instructions run on a processing device), firmware, or a combination of any of the above. For example, the server 130 in FIG. 1 may perform the process.

Referring to FIG. 2B, processing logic queries the repository for the profile of the system (processing block 220). Processing logic may compose the query based on the type of information requested by a user. For example, processing logic may use time A and time B as parameters in the query to retrieve the portion of the system profile between time A and time B if the user has requested to view the profile between time A and time B. Using the query, processing logic retrieves the profile or a relevant portion of the profile from the repository (processing block 222). Then processing logic presents the profile or the portion of the profile in a unified GUI (processing block 224). For instance, processing logic may present the profile in a directed acyclic graph displayed in a window. The directed acyclic graph may include multiple nodes representing the events and information related to the events (e.g., memory usage during the event, CPU utilization during the event, etc.) may be displayed at or near the corresponding nodes in the graph. More details of some embodiments of profile presentation have been described above.

FIG. 2C illustrates a flow diagram of one embodiment of a process to profile a system. The process may be performed by processing logic that may comprise hardware (e.g., circuitry, dedicated logic, programmable logic, microcode, etc.), software (such as instructions run on a processing device), firmware, or a combination of any of the above. For example, the server 130 in FIG. 1 may perform the process.

Referring to FIG. 2C, processing logic receives a user request for further details of the profile corresponding to a specified period of time (processing block 230). In response to the request, processing logic queries the repository for the details of the profile corresponding to the specified period of time (processing block 232). After retrieving the details, processing logic presents the details in the unified GUI (processing block 234). In other words, processing logic allows the user to zoom into the specified period of time. Details of some embodiments of zooming into a specified portion of a profile have been described above.

FIG. 3A illustrates one embodiment of a GUI in which embodiments of the present invention may be implemented. The GUI 300 shows events occurred in various subsystems 320 of client machine A and client machine B along a timeline 310. The subsystems 320 may also be referred to as sources of the events. The event occurring in a particular subsystem is displayed on about the same horizontal level as the name of the corresponding subsystem in the GUI 300. As such, a user of the GUI 300 may readily determine in which subsystem an event occurs.

Referring to FIG. 3A, the first event 331 along the timeline 310 is pressing of a button. The event 331 is followed by some disk activities 332. The next event 333 is the opening of a socket, which is followed by the event 334, writing to the socket. The next series of events 335A, 336A, 335B, 336B, 335C, and 336C are the sending and receiving of three packets. In addition, the GUI 300 includes three arrows 330 going from each packet sent to the corresponding packet received to illustrate the causation relationships between the sending and the receiving of the packets, followed by the event 337, which is reading a socket. The next event 338 is opening a file. Then the event 339 of reading the file follows. After the event 339, the events 341A, 342A, 341B, and 342B follow. The event 341A is a write followed by the event 342A, which is a read. Likewise, the event 341B is a write followed by the event 342B, which is a read. After the event 342B, there is some processing latency 343 before the next event 344, which is a draw.

FIG. 3B illustrates an alternate embodiment of a GUI in which embodiments of the present invention may be implemented. The GUI 350 illustrates various events along a timeline 351. Specifically, the GUI 350 illustrates a sequence of functions called 355 on top of the GUI 350. Underneath the sequence of functions called 355 is the level of CPU utilization 357 measured. Because both the sequence of functions called 355 and the CPU utilization 357 are presented along the timeline 351, a user may readily determine the level of CPU utilization when a particular function is called.

Underneath the CPU utilization 357 are the events occurred. Each event is represented by a box, in which a unique identifier of the respective event is displayed in the top half of the box. In addition, identifiers of events that have been determined to have caused and/or triggered the respective event are displayed in the lower half of the box. For example, event #5 is represented by the box 361, in which the event identifier, "EVENT #5" is displayed in the top half of the box 361. Since event #5 is not caused or triggered by any event, the lower half of box 361 is left empty. Event #7 is represented by the box 365, in which the event identifier, "EVENT #7" is displayed in the top half of the box 365. Since event #7 is caused or triggered by event #5, "EVENT #5" is displayed in the lower half of the box 365. Event #10 is represented by the box 367, in which the event identifier, "EVENT #10" is displayed in the top half of the box 367. Since event #10 is caused or triggered by event #8 and event #9, "EVENT #8" and "EVENT #9" are displayed in the lower half of the box 367.

In some embodiments, GUI 350 further includes arrows connecting some of the events to indicate causation relationships between these events. For instance, arrow 371 goes from box 361 to box 365 to indicate that event #5 represented by box 361 causes and/or triggers event #7, which is represented by box 365. On the other hand, there is no arrow going from box 363, which represents event #6, to any of the other boxes in the GUI 350 because event #6 does not cause or trigger any of the other events.

It should be apparent that the embodiments of GUI shown in FIGS. 3A and 3B are merely some examples to illustrate the concept. Variations to the above illustrations (such as addition of more information, deletion of some of the information, modifications to the representations shown, etc.) may be presented in other embodiments of the GUI.

Figure 4:
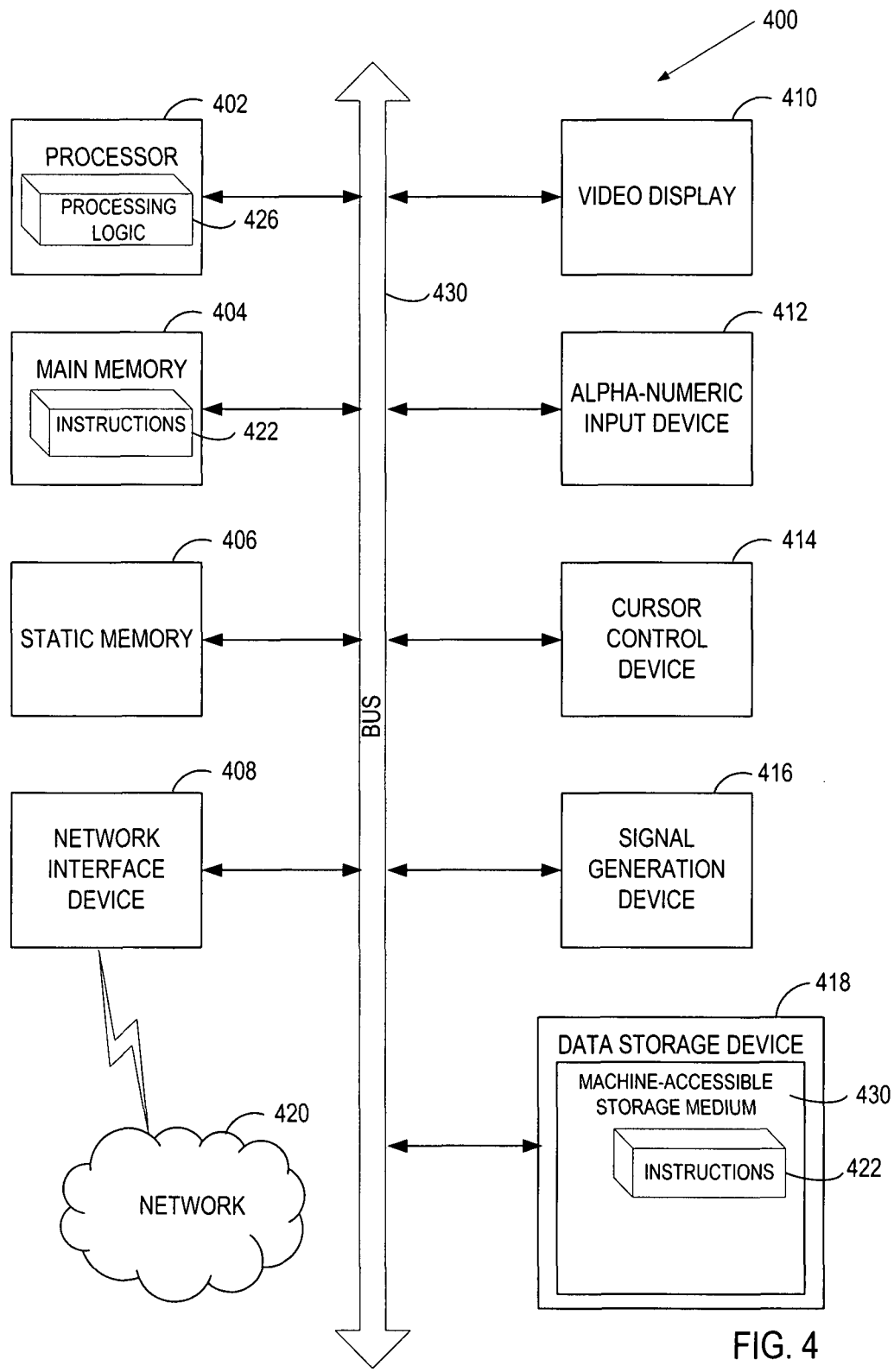
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 518 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set or instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a non-invasive time-based profiling tool have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    collecting information from a plurality of subsystems of a client machine in a system, the information comprising an event report corresponding to each of a plurality of events occurring in the plurality of subsystems, each event report indicating one of the plurality of subsystems on which a corresponding event occurred, a first identifier of the event and a cause identifier, wherein each event report is generated by a reporting client in each respective subsystem, and wherein the cause identifier associated with a first event comprises at least one of a unique identifier of a second event which caused the first event or an empty field;

responsive to determining that the cause identifier comprises an empty field, profiling, by a processing device, the system using the information collected from the plurality of subsystems to determine time values in the information associated with the first event and the second event of the plurality of events;

determining that a time value of the second event is within a defined period of time of a time value of the first event;

determining to indicate a causation relationship between the first event and the second event in view of the time value of the second event being within the defined period of the time value of the first event;

generating a timeline to display the plurality of events along with measurement data and a source subsystem of the plurality of subsystems corresponding to each of the plurality of events, wherein the plurality of events are plotted at positions along a first timeline axis relative to the determined time values corresponding to each event and at positions along a second timeline axis relative to the source subsystem of each event, the timeline comprising a visual indication of the causation relationship between the first event and the second event in view of the determining to indicate the causation relationship;

presenting the plurality of events on the timeline, wherein the presenting is performed in a graphical user interface (GUI); and in response to a user request made via the GUI, presenting additional details of a portion of the timeline comprising the visual indication of the causation relationship and corresponding to a period of time specified in the user request to initiate debugging of at least one of the plurality of subsystems.

2. The method of claim 1, wherein profiling the system using the information comprises:
tracing the plurality of events using the information; and
analyzing the plurality of events on a time basis.

3. The method of claim 1, wherein profiling the system using the information comprises:
correlating the plurality of events using the information to identify causation relationships between the plurality of events.

4. The method of claim 1, further comprising:
storing the time values in a repository; and
allowing users to access the repository to retrieve the time values.

5. The method of claim 1, further comprising:
instrumenting the plurality of subsystems to collect the information during execution of an application program without modifying source code of the application program.

6. The method of claim 1, wherein the event report further comprises a second identifier for a corresponding client machine, a third identifier for a corresponding subsystem in the corresponding client machine, a fourth identifier for an event type of the corresponding event, and a timestamp for the corresponding event.

7. The method of claim 1, wherein the GUI comprises a directed acyclic graph showing the plurality of events along the timeline and a set of zero or more causation relationships between the plurality of events, wherein the measurement data comprises at least one of memory usage or processing device utilization data.

8. An apparatus comprising:
a memory; and
a processing device, operatively coupled to the memory, the processing device to:
collect information from a plurality of subsystems of a client machine in a system, the information comprising an event report corresponding to each of a plurality of events occurring in the plurality of subsystems, each event report indicating one of the plurality of subsystems on which a corresponding event occurred, a first identifier of the event and a cause identifier, wherein each event report is generated by a reporting client in each respective subsystem, and wherein the cause identifier associated with a first event comprises at least one of a unique identifier of a second event which caused the first event or an empty field;
responsive to determining that the cause identifier comprises an empty field, profile the system using the information collected from the plurality of subsystems, the information being collected during execution of an application program in the system, to determine time values in the information associated with the first event and the second event of the plurality of events; and
determine that a time value of the second event is within a defined period of time of a time value of the first event;
determine to indicate a causation relationship between the first event and the second event in view of the time value of the second event being within the defined period of the time value of the first event;
generate a timeline to display the plurality of events along with measurement data and a source subsystem of the plurality of subsystems corresponding to each of the plurality of events, wherein the plurality of events are plotted at positions along a first timeline axis relative to the determined time values corresponding to each event and at positions along a second timeline axis relative to the source subsystem of each event, the timeline comprising a visual indication of the causation relationship between the first event and the second event in view of the determining to indicate the causation relationship;
present the plurality of events on the timeline, wherein the plurality of events are presented in a GUI; and
in response to a user request made via the GUI, present additional details of a portion of the timeline comprising the visual indication of the causation relationship and corresponding to a period of time specified in the user request to initiate debugging of at least one of the plurality of subsystems; and
a repository coupled to the processing device to store the time values.

9. The apparatus of claim 8, further comprising:
a network adapter communicatively coupled to the at least one client machine to receive the information.

10. The apparatus of claim 8, further comprising:
the processing device operatively coupled to the repository to retrieve the time values from the repository and to create a single GUI to present the time values.

11. The apparatus of claim 8, further comprising:
the processing device operatively coupled to the repository to generate a directed acyclic graph to present the plurality of events along the timeline and a set of zero or more causation relationships between the plurality of events, wherein the measurement data comprises at least one of memory usage or processing device utilization data.

12. The apparatus of claim 8, wherein the processing device further to trace the plurality of events and to analyze the plurality of events on a time basis.

13. The apparatus of claim 8, wherein the processing device to correlate the plurality of events to identify causation relationships between the plurality of events.

14. The apparatus of claim 8, wherein the event report further comprises a second identifier for a corresponding client machine, a third identifier for a corresponding subsystem in the corresponding client machine, a fourth identifier for an event type of the corresponding event, and a timestamp for the corresponding event.

15. The apparatus of claim 8, wherein the processing device to instrument the plurality of subsystems to collect the information without modifying source code of the application program.

16. The apparatus of claim 8, further comprising the at least one client machine.

17. A non-transitory machine-readable medium that provides instructions that, when executed by a processing device, will cause the processing device to:
  collect information from a plurality of subsystems of a client machine in a system, the information comprising an event report corresponding to each of a plurality of events occurring in the plurality of subsystems, each event report indicating one of the plurality of subsystems on which a corresponding event occurred, a first identifier of the event and a cause identifier, wherein each event report is generated by a reporting client in each respective subsystem, and wherein the cause identifier associated with a first event comprises at least one of a unique identifier of a second event which caused the first event or an empty field;
  responsive to determining that the cause identifier comprises an empty field, profile, by the processing device, the system using the information collected from the plurality of subsystems to determine time values in the information associated with the first event and the second event of the plurality of events to determine whether to indicate a causation relationship between the first event and the second event;
  generate a timeline to display the plurality of events along with measurement data and a source subsystem of the plurality of subsystems corresponding to each of the plurality of events, wherein the plurality of events are plotted at positions along a first timeline axis relative to the determined time values corresponding to each event and at positions along a second timeline axis relative to the source subsystem of each event, the timeline comprising a visual indication of the causation relationship between the first event and the second event in view of the determining whether to indicate the causation relationship;
  present the plurality of events on the timeline, wherein the presenting is performed in a graphical user interface (GUI); and
  in response to a user request made via the GUI, present additional details of a portion of the timeline comprising the visual indication of the causation relationship and corresponding to a period of time specified in the user request to initiate debugging of at least one of the plurality of subsystems.

18. The non-transitory machine-readable medium of claim 17, wherein to profile the system using the information the instructions to cause the processing device further to:
  trace the plurality of events using the information; and
  analyze the plurality of events on a time basis.

19. The non-transitory machine-readable medium of claim 17, wherein to profile the system using the information the instructions to cause the processing device further to:
  correlate the plurality of events using the information to identify causation relationships between the plurality of events.

20. The non-transitory machine-readable medium of claim 17, wherein the instructions further cause the processing device to:
  store the time values in a repository; and
  allow users to access the repository to retrieve the time values.

21. The non-transitory machine-readable medium of claim 17, wherein the instructions further cause the processing device to:
  instrument the plurality of subsystems to collect the information during execution of an application program without modifying source code of the application program.

22. The non-transitory machine-readable medium of claim 17, wherein the event report further comprises a second identifier for a corresponding client machine, a third identifier for a corresponding subsystem in the corresponding client machine, a fourth identifier for an event type of the corresponding event, and a timestamp for the corresponding event.

23. The non-transitory machine-readable medium of claim 17, wherein the GUI comprises a directed acyclic graph showing the plurality of events along the timeline and a set of zero or more causation relationships between the plurality of events, wherein the measurement data comprises at least one of memory usage or processing device utilization data.

* * * * *